(12) United States Patent
DeLuna

(10) Patent No.: US 10,514,122 B2
(45) Date of Patent: Dec. 24, 2019

(54) COMBINATION SPRAY NOZZLE/QD CONNECTOR ASSEMBLY FOR FILLING FIREFIGHTER BACKPACK BLADDERS

(71) Applicant: John M. DeLuna, Port Angeles, WA (US)

(72) Inventor: John M. DeLuna, Port Angeles, WA (US)

(*) Notice: Subject to any disclaimer, the term of this patent is extended or adjusted under 35 U.S.C. 154(b) by 0 days.

(21) Appl. No.: 15/962,595

(22) Filed: Apr. 25, 2018

(65) Prior Publication Data
US 2018/0335173 A1    Nov. 22, 2018

Related U.S. Application Data

(60) Provisional application No. 62/508,025, filed on May 18, 2017.

(51) Int. Cl.
| | | |
|---|---|---|
| F16L 37/23 | (2006.01) | |
| B05B 1/30 | (2006.01) | |
| A62C 11/00 | (2006.01) | |
| A62C 3/02 | (2006.01) | |
| A62C 31/03 | (2006.01) | |
| B05B 15/65 | (2018.01) | |

(52) U.S. Cl.
CPC ............ *F16L 37/23* (2013.01); *A62C 3/02* (2013.01); *A62C 11/005* (2013.01); *A62C 31/03* (2013.01); *B05B 1/3033* (2013.01); *B05B 1/3073* (2013.01); *B05B 15/65* (2018.02)

(58) Field of Classification Search
CPC .......... F16L 37/23; A62C 3/02; A62C 11/005; A62C 31/03; B05B 1/033; B05B 1/14; B05B 15/65; B05B 1/3073; F16K 31/58; Y10T 137/87925–87973; Y10T 137/9029
USPC ............ 239/451, 453, 456.457, 458; 137/614–614.06, 798; 251/149.1, 251/149.6–149.9
See application file for complete search history.

(56) References Cited

U.S. PATENT DOCUMENTS

| | | | | |
|---|---|---|---|---|
| 1,508,993 A | * | 9/1924 | Sherman | ............. B05B 1/308 |
| | | | | 239/458 |
| 2,121,747 A | * | 6/1938 | Scholtes | ............. B05B 1/308 |
| | | | | 239/458 |
| 2,347,476 A | * | 4/1944 | Graham | ............. B05B 1/265 |
| | | | | 239/458 |

(Continued)

*Primary Examiner* — Craig J Price
(74) *Attorney, Agent, or Firm* — Jacques M. DuLin, Esq; Innovations Law Group, Ltd.

(57) ABSTRACT

Wildfire water-supply hose having a QD nozzle with an outer sleeve adapted to engage a firefighter's backpack water bladder's QD connector. The combination male QD nozzle/female QD system permits rapid and easier bottom-up filling of the bladders without dismounting the tank from the firefighter's back, by inserting the QD nozzle into the female QD fitting on the bottom of the backpack bladder. The QD nozzle tip is long enough to open the internal spring-biased shut-off valve in the female QD connector when inserted. Upon opening the supply line valve, water flows into the backpack bladder until full. The supply valve is closed and the QD nozzle is withdrawn from the bladder female QD connector. Rotation of the QD nozzle outer sleeve controls water flow from stream, to spray to mist. The QD nozzle is also used with other types of nozzles on dual fittings having 3-way valves, e.g., fog nozzles.

2 Claims, 5 Drawing Sheets

(56) References Cited

U.S. PATENT DOCUMENTS

| | | | | |
|---|---|---|---|---|
| 2,417,655 A * | 3/1947 | Lindsay | ............... | B05B 1/12 |
| | | | | 169/70 |
| 2,474,332 A * | 6/1949 | Sciuto | ............... | B05B 1/308 |
| | | | | 239/458 |
| 2,568,515 A * | 9/1951 | Scheiwer | ............... | B05B 1/14 |
| | | | | 239/289 |
| 2,761,469 A * | 9/1956 | Hansen | ............... | F16L 37/23 |
| | | | | 137/513.5 |
| 4,614,303 A * | 9/1986 | Moseley, Jr. | ............... | B05B 1/308 |
| | | | | 239/499 |
| 4,688,643 A * | 8/1987 | Carter | ............... | B05B 9/0426 |
| | | | | 169/33 |
| 4,840,313 A * | 6/1989 | Hansen | ............... | B05B 1/12 |
| | | | | 239/456 |
| 7,543,762 B1 * | 6/2009 | Cheng | ............... | B05B 1/1627 |
| | | | | 239/391 |
| 2006/0174968 A1 * | 8/2006 | De Luna | ............... | A62C 99/00 |
| | | | | 141/114 |
| 2013/0037629 A1 * | 2/2013 | Boquet | ............... | B05B 1/3013 |
| | | | | 239/456 |

\* cited by examiner

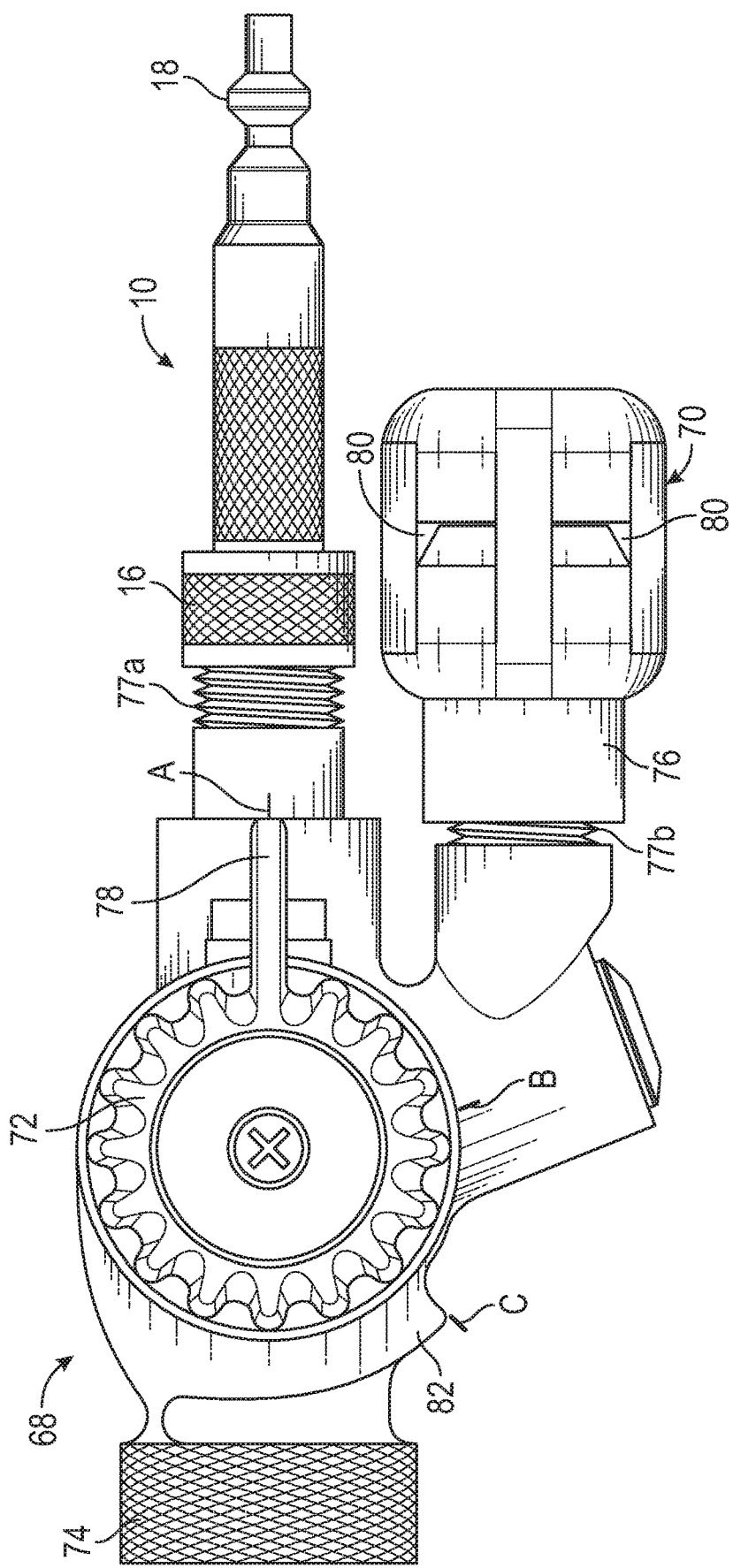

COMBINATION SPRAY NOZZLE/QD CONNECTOR ASSEMBLY FOR FILLING FIREFIGHTER BACKPACK BLADDERS

CROSS-REFERENCE TO PROVISIONAL PRIORITY APPLICATION

This application is the Regular U.S. Application corresponding to and having its priority from U.S. Provisional Application Ser. 62/508,025, filed May 18, 2017 by the same inventor under the same title, the priority of which is claimed under 35 USC § 119, ff.

FIELD

The invention relates to the field of wildfire fighting equipment used in remote wild-land fire suppression, and more particularly to a supply/suppression hose fitted with the inventive spray nozzle having a special outer sleeve adapted to engage a special female quick connect/disconnect fitting that includes an internal spring-biased shut off valve. The combination QD nozzle/female QD fitting system permits rapid and easier bottom-up filling of the backpack bladder (water reservoir) by inserting the inventive nozzle into the QD fitting on the bottom of the backpack bladder. Once jacked-into the fitting, the supply line valve is opened, the water flows into the backpack tank until full. Then the valve is closed and the nozzle is withdrawn from the bladder female QD fitting and the firefighter is ready to go, the backpack tank having been filled from the bottom without de-mounting the tank from the firefighter's back. At the location of the fire, the nozzle attached to the end of the pencil or "toy" hose is used to provide fire suppression water stream. The amount the nozzle sleeve is rotated adjusts the water delivery from a stream, to cone, to mist. The inventive nozzle is also useful in a wide variety of fluid transfer applications, including but not limited to pressure washers, sprayers and fluid conduits to hoses, and the like. In the alternative, the inventive nozzle may be fitted to hand pumps used with bladders. To fill the bladder, the nozzle is inserted in a female QD connector attached to a supply hose, tank or pump.

BACKGROUND

In the field of remote wild land fire suppression, fires often extend into road-less areas of extremely rocky or forested terrain characterized by steep changes in elevation, which are inaccessible to tanker trucks. In these cases, tanker trucks are driven as close to the fire line as safely possible. A main 2.54 cm (1") supply hose is extended as far as possible toward the fire, and it may be extended by, or branch off with, one or more smaller fabric lay-flat type hoses, called pencil or "toy" hoses. These hoses use male and female garden-thread type fittings. The lay-flat hoses are light weight and can be easily rolled up and stowed in a backpack.

The ends of the pencil hoses are fitted with a garden-type nozzle used for fire suppression in the area reachable by those hoses as limited by the pump-supplied water pressure. For more distant locations, individual firefighters don 18.93 liter (5-gallon) backpack-type canvas or neoprene reservoirs or bags, called "bladders", which permit them to range on foot even farther into the brush than can be reached by the supply and pencil hoses. The backpack bladders have a bottom fitting including a female QD connector into which is jacked a short flexible hose and manual slide pump having an adjustable nozzle. This allows firefighters to walk into more remote and difficult terrain carrying their own reservoirs of water or fire suppression foam to douse hot spots, knock down grass fires, and attend to fire suppression in difficult-to-reach areas.

The weight of a backpack filled with 18.93 liters (5 gallons) of water is more than 18.14 kg (40 pounds), which firefighters must carry in addition to their other heavy equipment such as shovels, chainsaws, hard hats, axes and heavy boots. But 18.93 liters (5 gallons) of water is exhausted quickly, requiring firefighters to repeatedly trek back over rough terrain to the water source to refill the backpack bladder. While the source is typically the pencil hose extended from the parked tanker truck, it can be any hose attached to a portable pump used to supply water under, pressure from streams, lakes or waterfalls. Because of the service requirements, the back-pack reservoir, slide pump, supply hose and the various fittings must be robust.

Standard issue for many wildfire departments includes a backpack reservoir, such as: the Indian Fedco Collapsible (bag-type) or Galvanized Steel Backpack Firefighting Pump, available from Forestry Suppliers Inc. of Jackson, Miss.; the Flexpak collapsible canvas bag-type backpack tank from Firehouse International Inc. of Anchorage Ak.; or the Wildfire Backpack or Neoprene Collapsible Backpack available from Wildfire Equipment of Lachine, Canada.

The current method for refilling these reservoirs is to remove the backpack from the back, unscrew the threaded top cap, insert a hose, and allow the pack to fill with water while the firefighter holds it upright to prevent spillage. Large hoses connected to the tanker truck are generally stepped down to fit a length of standard, 1.9 cm (¾") diameter pencil hose that typically terminates in a plastic ball valve fitting. Once the garden hose is inserted into the backpack bag, the valve is rotated open to allow water to flow.

Soft-sided, collapsible backpacks, the preferred embodiment of such packs (preferred for their compact size, foldability and ease of transport when empty), are made either with a screw cap at the bladder top and a pump hose port at the lower end, or with a combined cap and pump hose port located at the bottom of the bladder. Regardless of bladder design, both are filled by holding the opening in an upright position during filling. For some bladders, this means turning it upside down. Both types of bladders must be supported during filling, as it is the water itself which fills out their shape. At the same time, the hose must be held in the other hand to prevent it from slipping out of the relatively large cap hole under its weight and the pressure of the flowing water. In addition, for bottom-cap bladder, they must be taken off the firefighter's back; the bladder cannot even be filled by others helping the wearer. Often, water overflows the bladder as the firefighter struggles to support the bag while turning the shut-off valve. The result is a muddy, wet pack to put on his or her back before hiking back out into the remote wildfire area and waste of valuable fire suppression water.

One aspect of the unsolved problem in the art is that backpack tanks must be removed for top filling, or removed and inverted for bottom filling. In addition, standard garden hose quick-disconnect fittings neither match backpack fittings and nor are they sufficiently robust for wildfire field work. Garden-type female quick-disconnect fittings do not have an auto-shut-off feature, that is, they do not have an internal valve that automatically closes to prevent leakage when the male quick-disconnect fitting is removed. Fittings mis-match is deliberate; the purpose of the mis-match is to prevent parts from being used for the wrong application, that is, garden-type fittings cannot be used in hydraulic applications. Thus, a standard garden-type female QD connector cannot be used on a backpack tank bottom cap to permit bottom-up filling of tanks.

Hence, there is an unmet need in the art for a fast, efficient system of filling backpack reservoirs that precludes the need to dismount the bag or tank, remove the top or bottom cap and then hold a supply hose inside the bag while simultaneously supporting the bag to prevent spilling, and which permits filling directly from a supply pencil hose without dis-connecting any of the pencil hose fittings, yet which which system is robust enough for the service conditions encountered in fighting wildfires.

THE INVENTION

Summary

Broadly speaking, the invention comprises a universal, fluid transfer, quick-connect/disconnect coupling union assembly (herein "Q-D" assembly) comprising a two part combination of elements: 1) an adjustable, twist-type spray nozzle having an outer sleeve that is specially adapted to engage a female QD connector, and 2) a female QD connector assembly that includes an internal spring-biased automatic shut-off valve.

The adjustable spray nozzle includes an inner, threaded stem terminating in an inversely, conically tapered spray tip, and an outer threaded collar the outer end of which is configured with a conical taper to cooperate with the spray tip to produce a variable spray stream. The collar engages the threads of the stem and by rotating the cooperating tips produce an outflow varying from stream, to conical spray, to mist, and when fully rotated, to close off the flow. Thus, the spray tip may also act as a rotary valve.

The outer collar of the nozzle assembly is specially configured medial of the tip to have angled shoulders that engage and are retained by internal retractable ball detents of the female QD connector. The collar spray tip is also long enough so that its outer end engages the spring-biased internal valve of the female QD connector so that upon insertion, the valve is opened and fluid can flow once the outer collar is rotated to the open position or the ball valve of the supply hose (e.g., pencil supply hose) is rotated to the open position.

The female QD connector includes a spring biased collar that is axially slidable to permit ball detents to lockingly engage the angled shoulders on the outer sleeve of the spray nozzle. The female QD connector also includes an internal, spring biased axially movable fluid shut-off internal to the assembly.

For purposes of discussion, reference to the term "backpack bladders" applies equally to collapsible bags and to rigid containers, whether of the backpack type, wheeled, portable or fixed. The parts can be supplied as a kit.

The nozzle includes at the end opposite the tip with either a male or female threaded ferrule sized to connect to the standard pencil supply hose. In the examples given herein, the ferrule is a threaded female fitting. Although the pencil supply hoses typically include an in-line ball-type shut-off valve, that valve may be omitted, as the nozzle also has the function of a shut-off valve when rotationally screwed to the closed position. The female QD connector has at its opposed, inlet end a threaded ferrule, either male or female, that is sized to engage corresponding threads of bladder bottom fitting. In the examples herein, the QD connector has male threads to engage a female fitting of the bladder. Since the female QD connector of this invention has an internal automatic shut-off valve, no additional shut-off valve is needed on the bladder or tank fitting.

The inventive nozzle/QD connector permits rapid bottom fill of backpack bladders without removal from the firefighter's back, whether the bladder is top or bottom fill. Only four steps are needed to fill the bladder:

1. Without taking the backpack off, pop out the hand pump hose connector from the female QD connector at the bottom of the bladder.
2. Insert the inventive nozzle attached to the delivery end of the pencil supply hose into the QD fitting at the bottom of the bladder; the QD valve is automatically opened;
3. Rotationally open the ball valve on the pencil hose to the fullest extent; the supply water flows into the bag until full, upon which the ball valve is closed; and
4. Release the nozzle from the bladder QD connector.

There is no need to dismount the bag from the firefighter's back to fill and no need to remount the full bag on the firefighter's back. The fill sequence is so short that more firefighters can refill faster in a short time. Indeed, with a multi-pencil hose manifold on the end of the main supply hose or tank, multiple firefighters can resupply their backpack bags simultaneously, one to each pencil hose supply, making for much faster response times to control wildfires.

Because the inventive nozzle/QD connector system solves a need in the art for dual function fitting (spray nozzle acting as a fill control valve in combination with a female QD connector), it is suitable for uses well beyond those of the wildfire fighting field, including the delivery of a variety of environmental treatment fluids, including insecticides, herbicides, fertilizers, liquid moss control compositions, fungicides, algaecides, mildew control, fire suppressants, water proofing, stain repellants, pest control and cleaning solutions.

The inventive Q-D fluid transfer assembly is thus universal, in that it provides multiple configurations to match the wide variety of backpack bags available in the industry. There are two main bag configurations: A. Bags with a 5.08-10.16 cm (2-4") screw cap at the top for filling and a hose pump port at the bottom; and B. bags with a combined 5.08-10.16 cm (2-4") screw cap (or other fitting, which may be permanently secured to the reservoir wall) with a hose pump port built into the cap or in a flange, either located at the bottom of the bag. Hose pump ports, always located at the bottom of the bag (for gravity feed), come in two general configurations: 1) those with fixed fittings (such as a brass elbow and hose barb for connecting to the sprayer/slide-pump hose); and 2) those with a female quick-disconnect fitting, into which the inventive nozzle male quick-disconnect fitting is snapped for use. In the inventive combination, the bottom of the bladder is fitted with the female quick disconnect fitting having an axially spring-biased closure valve.

The inventive universal coupling solves the need in the art by use of a hydraulic-type female QD connector having an internal spring-biased valve. The standard garden-type female QD fittings do not have internal valves and would required at least an additional valve to be used.

In addition, commercial garden-grade QD fitting materials do not have the necessary service life for the rough conditions of wildfire fighting. For firefighting conditions, brass or stainless steel is preferred for its robust qualities and lack of corrosion by firefighting chemicals. Where plastic is considered for lighter weight, a much higher, tougher grade is required, such as polycarbonate or Delrin, to provide the necessary service life robustness.

For bladders not having a female QD connector mounted at the bottom, the invention includes providing one for installation so that the bladders include an auto-shut-off. The nozzle outer sleeve QD shoulders are sized to matingly engage the ball detents of the female QD connector and have a nozzle length sufficient to fully open the QD connector valve element.

Thus, in its broad aspects the inventive system is a fluid transfer connector assembly, comprising in operative combination: a) a quick-disconnect coupling union including: i) a first, female member having a first, threaded end for threaded coupling to a bag or container for dispensing fluid therefrom, said threaded end being selected from a male-threaded end and a female-threaded rotating collar, and a second end having a collar that is axially reciprocable to releasably receive a second, male quick-disconnect nozzle and having an internal auto-shut off; ii) a second, male nozzle specially adapted with quick-disconnect shoulders on its outer sleeve and with a nozzle tip of sufficient length to releasably engage the sliding internal valve of the female QD member. The outer sleeve of the nozzle is rotatable with respect to an inner stem to provide flow control of water, that is, function as a nozzle to provide delivery ranging from a stream, to spray to mist.

The inventive device provides several benefits, exemplary ones being:

- It saves water by eliminating the overflow often associated with the current method of refilling the bags, that is, an unsealed 5.72 cm (2¼) bag opening into which is inserted a 1.9 cm (¾") water hose, and a firefighter who must hold the bag upright with one hand and fill it with the other, then close the shut-off valve of the hose at precisely the right moment to prevent overfill, without letting go of the collapsible bag, thereby causing water to pour out of the non-rigid vessel;
- It makes it possible for the backpack to be connected and thereby sealed in a watertight fashion to the hose to fill without having to be propped up or otherwise attended by a firefighter, thus allowing the firefighter a short respite between forays into the fire area; and
- It enables one firefighter to "hook up" another's backpack to the hose, while the pack is still worn on the back of the second firefighter, thus saving time and conserving firefighter energy.

In addition, the inventive QD nozzle may be used in conjunction with what is known as a forester nozzle screwed onto a dual-nozzle fitting for a 2.54 cm (1") wildfire supply hose. The forester nozzle has a 2.54 cm (1") threaded female connector that is screwed onto the dual nozzle fitting. The forester nozzle combines aspirated air to form a water "fog" in a broad spray for fire suppression. The dual fitting includes a 3-way rotary valve that permits the firefighter to switch between the inventive nozzle for more targeted spot fire suppression and the forester fog nozzle for wider area fire suppression.

A note about terminology: It should be understood that what is known in the wildfire field as a 1.9 cm (¾") fitting is a reference to a fitting for a standard toy, pencil or garden hose of 1.9 cm (¾") size, and such fittings, by measure are nominal 2.54 cm (1") fittings. Garden hose fittings (male and female) are the same size, regardless of hose size, whether ½", ⅝" or ¾".

BRIEF DESCRIPTION OF THE DRAWINGS

The invention is described in detail by reference to the drawings in which:

FIGS. 1A-1D are a series showing the inventive spray nozzle assembly, in which FIG. 1A is a side elevation view of the nozzle; FIG. 1B is a section view of the nozzle taken along line A-A of FIG. 1A; FIG. 1C is an isometric view of the nozzle; and FIG. 1D is a exploded view showing the outer sleeve and inner stem parts of the nozzle;

FIGS. 2A-2D are a series showing the inventive spray nozzle assembly engaging the female QD connector, in which FIG. 2A is a side elevation view of the nozzle inserted in the female QD connector; FIG. 2B is a section view of the nozzle/female QD connector assembly taken along line A-A of FIG. 2A; FIG. 2C is an isometric view of the nozzle/female QD assembly of FIG. 2A; and FIG. 2D is a exploded view showing the nozzle outer sleeve and inner stem, and the female QD connector.

FIG. 5 is an elevation view of a dual nozzle assembly combining the inventive QD nozzle with a forester-type wide-angle fog nozzle that includes a rotary valve to switch between nozzles for specific application.

DETAILED DESCRIPTION OF THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention.

The Figures are numbered and annotated so that one skilled in the art of hydraulic or pneumatic flexible hose fitting, by reference to the attached parts list will easily be able to understand the materials and method of construction and will be able to easily assemble the parts to achieve the functionality shown. In this connection, note that neither the bladder bag nor the fire hose are shown; it should be understood that the fire hose connects to the bladder bag, and the valve union connects to the fire hose.

Figure 1A:
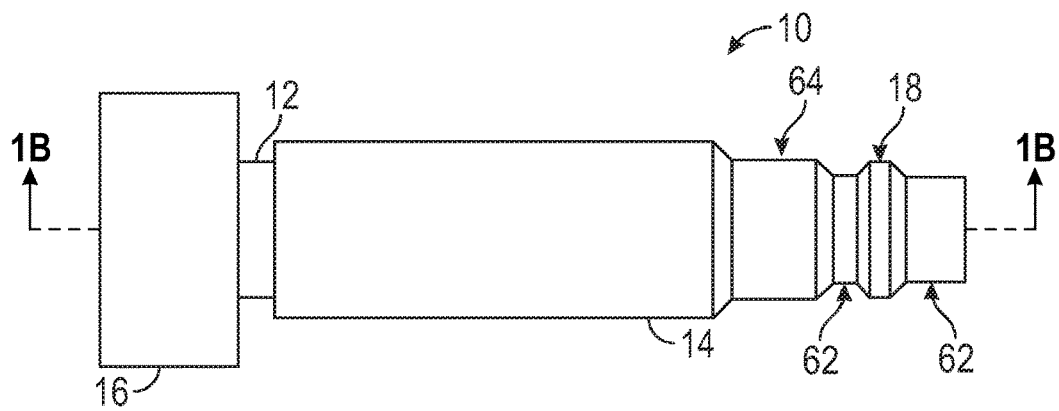

FIGS. 1A-1D are a series showing the inventive spray nozzle assembly, in which FIG. 1A is a side elevation view of the nozzle 10 comprising a inner stem internally threadedly engaging, 22, an outer sleeve 14. The stem terminates in a female threaded ferrule 16. The outer sleeve terminates at its forward end in a pair of spaced convergent shoulders 18 which are spaced forwardly of a necked-down section 64 to form a groove to receive the ball detents of the female QD connector 34 (see FIG. 2). The tip 20 of the outer sleeve 14 extends forwardly of the shoulders 18 to permit engagement with the internal valve of the female QD connector.

Figure 1B:
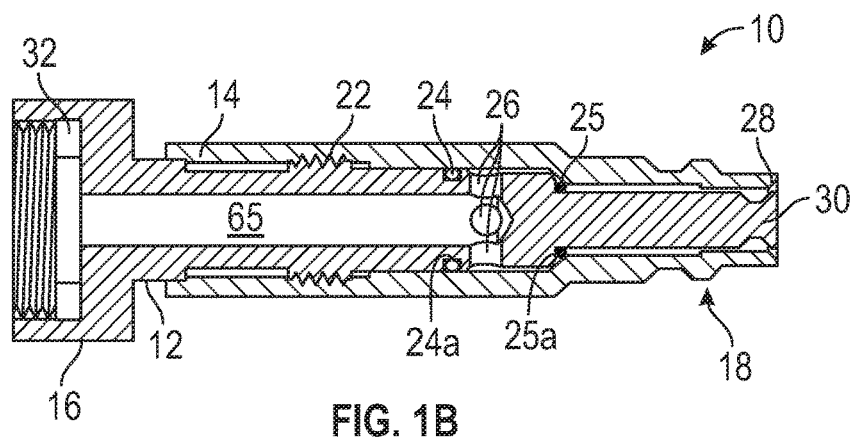
Figure 1C:
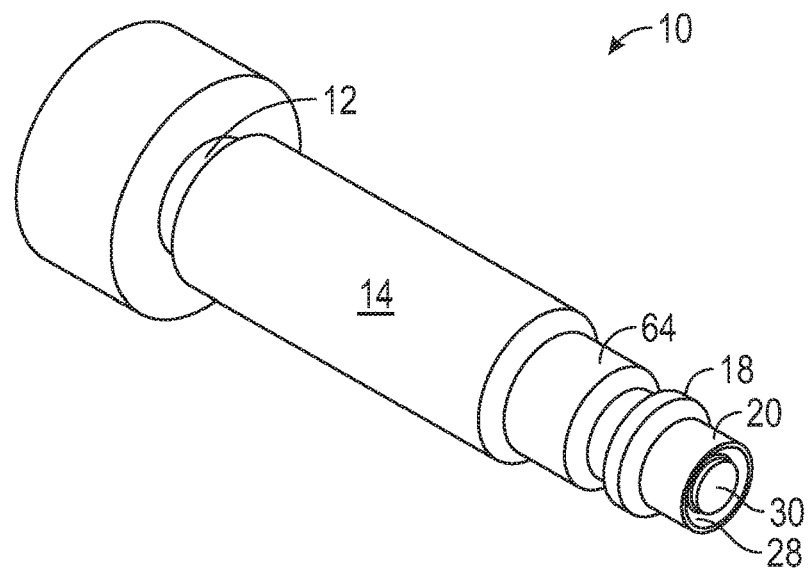
Figure 1D:
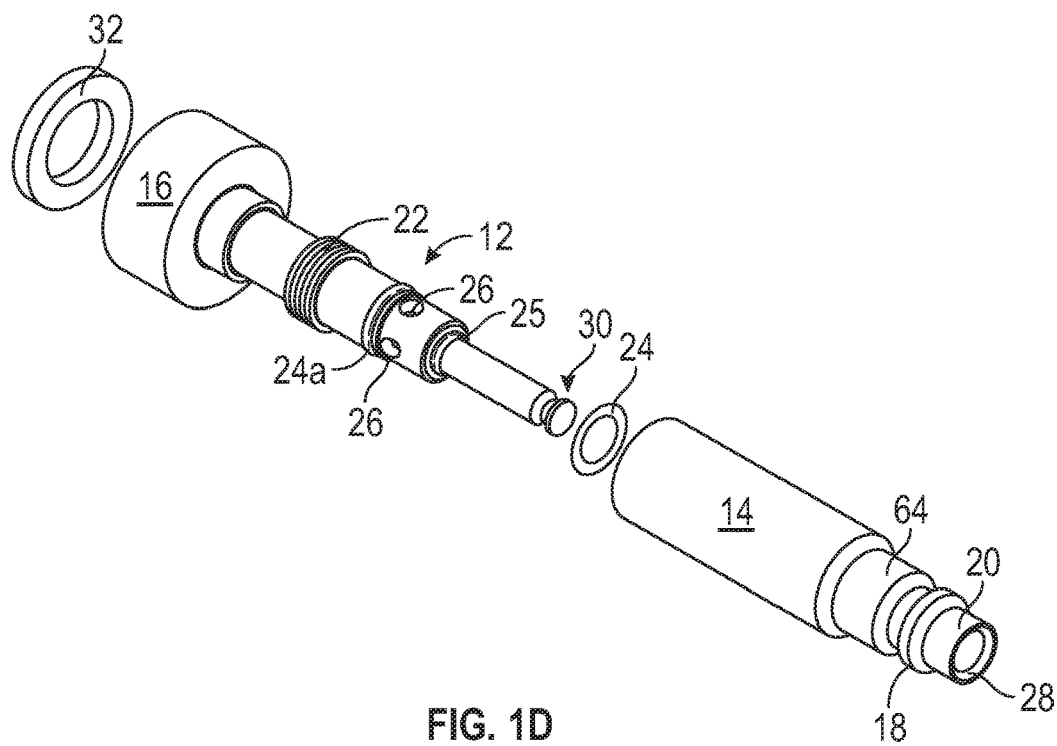
Figure 4:
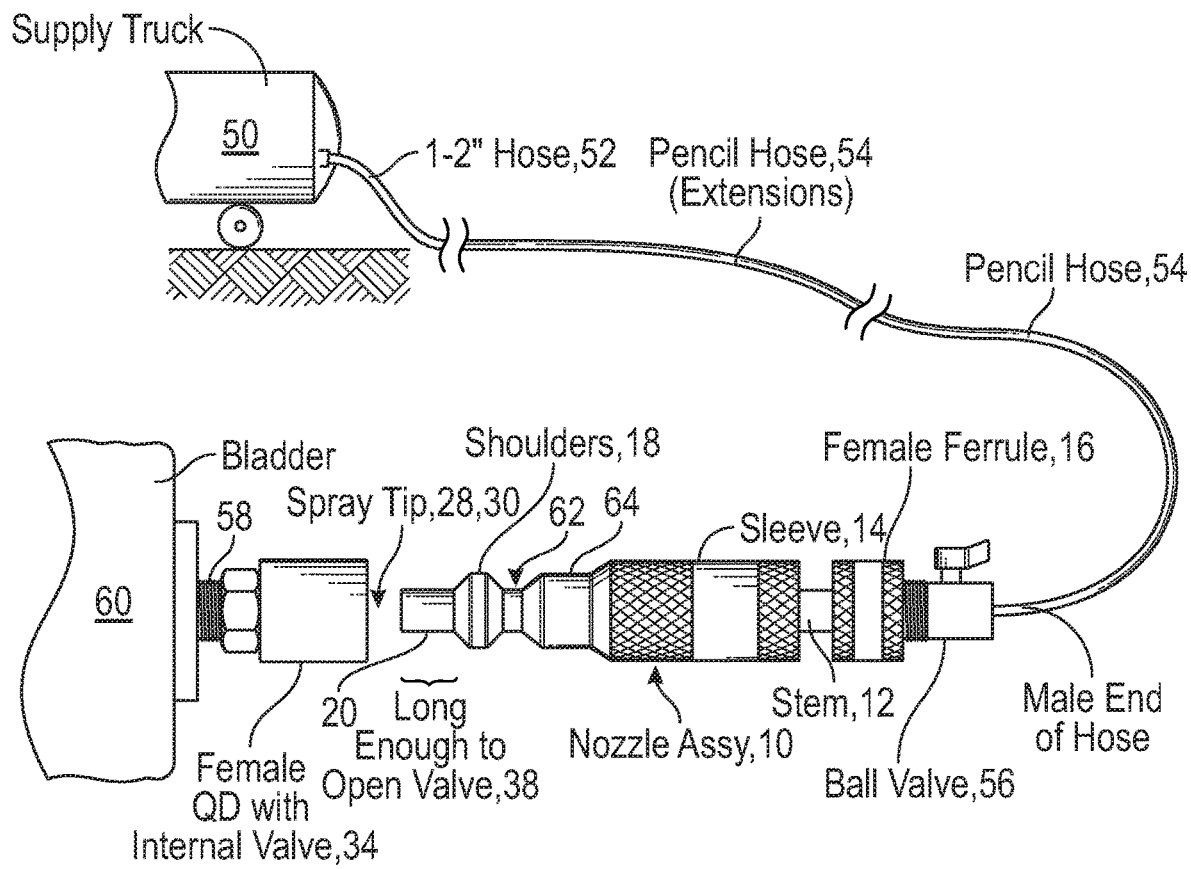
FIG. 4 is a diagram of the system field use of the inventive assemblies.

FIG. 1B is a section view of the nozzle 10 taken along line A-A of FIG. 1A, showing the inner stem 12 threaded, 22, into the outer sleeve 14. The ferrule includes threads as shown and a gasket 32 to seal the nozzle 10 to the male outlet ferrule of a pencil supply hose 54 (FIG. 4). The inner stem 12 includes a pair of sealing O-rings 24 (in groove 24a) and 25, as well as a central bore 65 for water flow. When the outer sleeve is rotated to the open position, the nozzle tip 30 of stem 12 projects forward of the conical seat 28 of the outer sleeve, and water can flow through the flow ports 26 of the stem 12. FIG. 1C is an isometric view of the nozzle 10, showing the tip 30 seated against the seat 28. FIG. 1D is a exploded view of the nozzle assembly showing the outer sleeve 14 and inner stem 12 parts of the nozzle, threads 22, a first O-ring 24 and the groove it fits in, 24a, and a second O-ring 25, as well as the supply hose gasket 32. In addition, the water flow ports 26, the tip 30 and the seat 28 are better seen in this view. Note the inner, forward shoulder 25a of the outer sleeve 14 seals against the O-ring 25 to provide a positive shut-off of the water supplied by the hose 54.

Figure 2A:
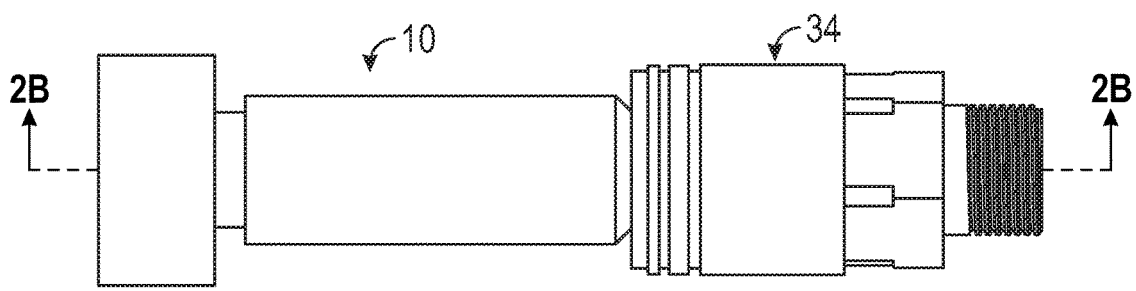
Figure 2B:
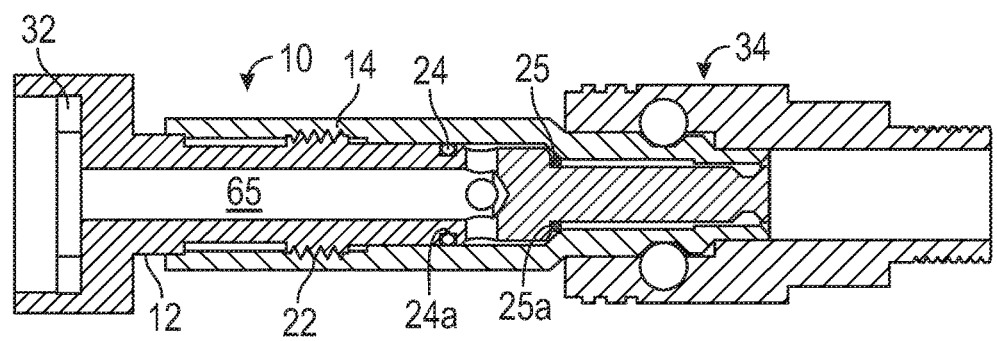
Figure 2C:
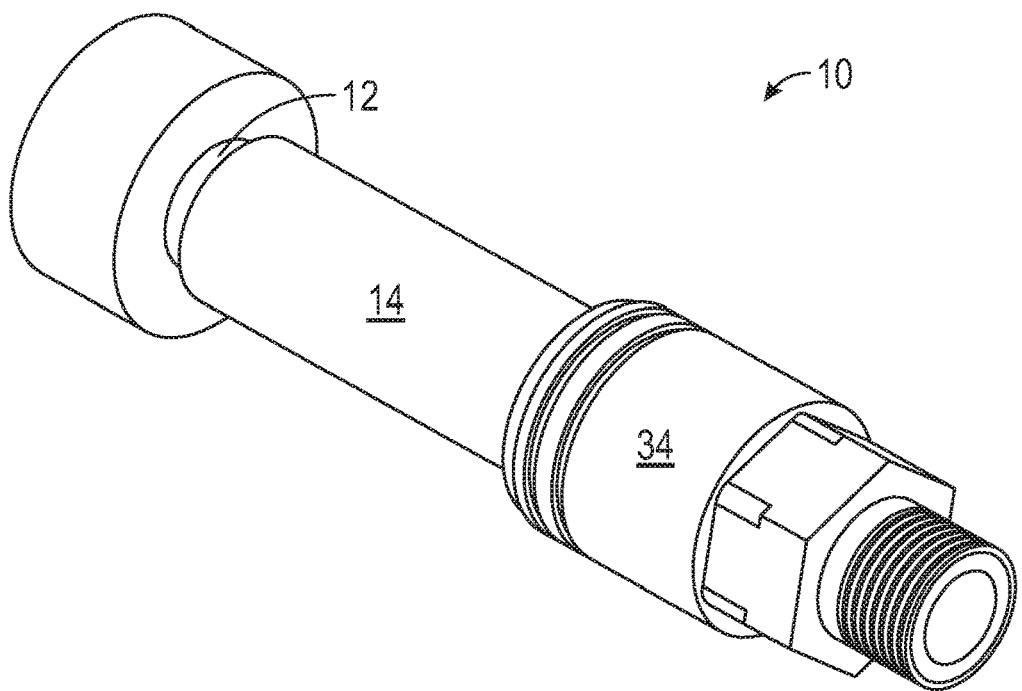
Figure 2D:
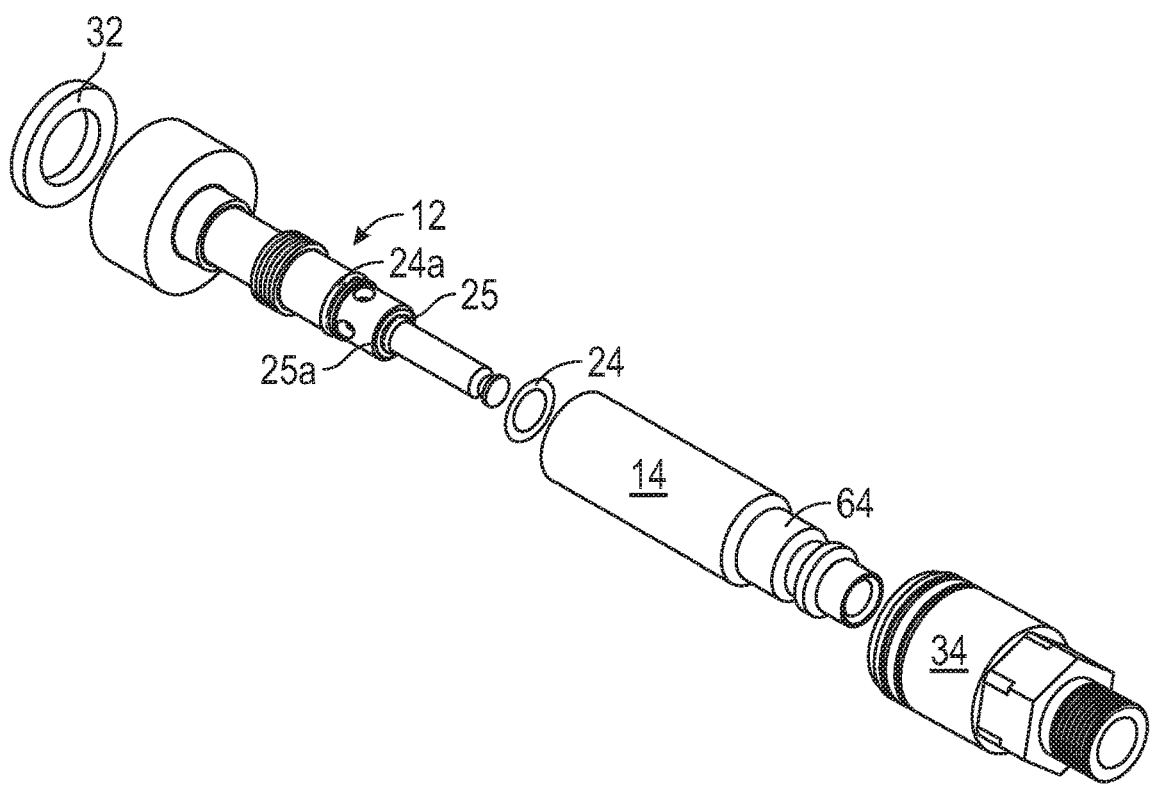
Figure 3:
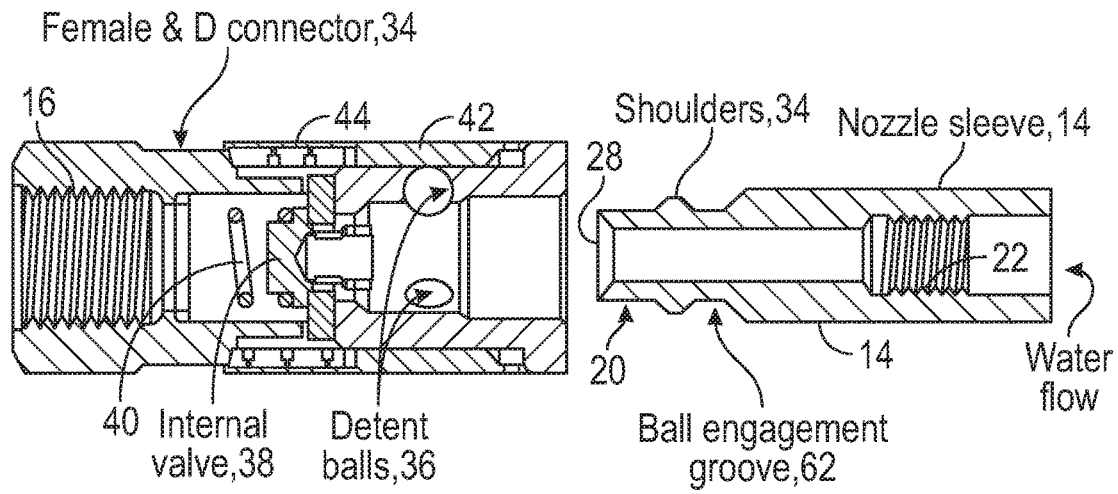
FIG. 3 is a section view through an exemplary female QD connector showing the internal spring-biased valve and the nozzle external sleeve that engages the valve to open it when inserted and showing in section view how the nozzle sleeve engages the detent balls of the female QD connector.

FIGS. 2A-2D are a series as in FIGS. 1A-1D showing the inventive spray nozzle assembly 10 engaging the female QD connector 34. FIG. 2A is a side elevation view of the nozzle 10 inserted and fully seated in the QD connector 34. FIG. 2B is a simplified section view of the nozzle 10 seated in the female QD connector assembly 34 taken along line A-A of FIG. 2A; the part numbers are the same. The details of the internal valve assembly of the female QD connector are shown in FIG. 3. FIG. 2C is an isometric view of the nozzle/QD assembly of FIG. 2A. FIG. 2D is a exploded view showing the nozzle outer sleeve 14 and inner stem 12 as described above with reference to FIG. 1D, and the female QD connector 34. Note the groove 24a for the first O-ring 24, and the second O-ring 25 in place against the upper shoulder 25a of the inner step 12.

FIG. 3 is a section view through an exemplary female QD connector 34 on the left showing the internal detent balls 36, the axially reciprocable valve 38, shown biased by spring 40 in its closed position. The external sleeve 42 is also biased by spring 44; as shown the detent balls are forced radially inwardly which will be in the position for locking engagement with the ball engagement groove 62 of the nozzle sleeve 14, shown to the right. The tip of the sleeve 20 is long enough to engage the forward end of the tubular valve 38 pushing it to the open position (toward the left in the figure) thereby permitting water to flow from an open nozzle through the ports 26 of the female connector valve assembly 38. When the forward end of the nozzle 20 is pushed into the QD connector 34, and its outer sleeve 42 is retracted (to the left in FIG. 3), the balls 36 ride over the shoulders 18 and into the locking groove 62. The female QD connector sleeve is released and the spring traps the balls 36 in the groove 62. The nozzle 10 is now lockingly engaged with the QD connector 34 and filling can begin.

FIG. 4 is a diagram of the inventive system in field use. A water supply, here shown by way of example as a supply tanker truck 50 is brought as far forward into the wildfire area as feasible, a main supply hose 52 is hooked up, and one or more pencil hoses 54 are attached to the end of the main supply hose. At the end of an exemplary pencil hose 54a, a ball valve 56 is threaded onto the male ferrule (not shown) of the pencil hose. The ball valve terminates in male threads, which engage the female ferrule 16 of the nozzle stem 12. As described above with reference to FIG. 3, the nozzle sleeve 14 is jacked into the female QD connector 34 which is threaded into a fitting at the base of bladder 60. In this embodiment the female QD connector 34 terminates in male threads 58; compare to FIG. 3 in which the connector 34 may include a female threaded ferrule 16. This completes the connection, the ball valve is opened and the nozzle is also opened, permitting supply water to fill the bladder 60 from the bottom, while still mounted on the back of the fire fighter. Once the bladder is filled, another firefighter can use the nozzle 10 connected to the end of the pencil hose 54a as a nozzle, adjusting the outer sleeve with respect to the inner stem to provide an appropriate spray pattern (rather than a full fill stream), to put out fire hot spots within his reach of the pencil hose 54a.

FIG. 5 is an elevation view of a dual nozzle assembly 68 combining the inventive QD nozzle 10 (nozzle "A" in this example) with a forester-type wide-angle fog nozzle 70 (nozzle "B" in this example) that includes a 3-way rotary valve 72, e.g. a ball type valve, to switch between nozzles A and B for specific application. The inventive QD nozzle 10 is screwed onto the output threads 77a of straight-through branch (left branch) of the dual nozzle assembly 68. The forester nozzle 70 has an internally threaded female connector 76 that is screwed onto threads 77b of the dual nozzle fitting 68 (as shown, the right branch). In turn, the dual nozzle fitting 68 includes a 2.54 cm (1") internally threaded supply fitting 74 at its inlet end for connection to a 2.54 cm (1") wildfire supply hose. The forester nozzle 70 combines water with air aspirated into the nozzle via slots 80 to form an air-water fog in a broad spray for fire suppression. The dual nozzle fitting 68 includes a 3-way rotary valve 72 that includes a pointer 78.

The 3-way valve 72 permits the firefighter to switch from a closed position with the pointer against stop 82 at position C, to the inventive QD nozzle 10 at position A for more targeted spot fire suppression, and to the forester fog nozzle 70 at position B for wider area fire suppression. While the fog nozzle 70 is shown mounted on the right side of the dual nozzle assembly 60 so that it is connected to the supply 74 via the valve being selectively rotated to position B, it is evident that the fog nozzle 70 and QD nozzle positions can be swapped, so that the fog nozzle is supplied in a direct line to the supply 74 with the valve being selectively rotated to position A. Likewise, depending on valve construction, the A, B and C flow or shut-off may be in any convenient position, rather than 120° as shown.

Accordingly, the inventive nozzle configured with an outer sleeve having QD shoulders and ball engagement groove, and with an extended tip to engage the internal valve of a female QD connector, permits the nozzle to double its functionality: both standard sprayer nozzle and QD fill connector.

INDUSTRIAL APPLICABILITY

It is clear that the inventive quick disconnect nozzle has wide applicability to the wildland firefighting industry, namely to enable firefighters to refill backpack reservoirs quickly, without having to remove and support the bag or the hose while doing so.

Various modifications within the scope of this invention can be made by one of ordinary skill in the art without departing from the spirit thereof and without undue experimentation. For example, if 2.54 cm (1") nominal "pencil" hose is not the local standard, a quick-connect nozzle following the principles of this invention can be fabricated with a ferrule sized to fit the hose and the female connector fitted into a bladder. Other types of nozzles may be fitted onto the dual-tip fitting of FIG. 5 as an alternative to the fog forester-type nozzle. Or if bladder bag designs should change over time, resulting in an inlet fitting or cap of a different size or fabrication, such cap or fitting can easily be fitted with an appropriate female QD connector to allow the inventive Q-D elements to be used therewith.

The invention claimed is:

1. A quick-connect/disconnect coupling system for rapid water transfer into a portable fire suppression backpack water container used by a wildfire firefighter manning a fireline without dismounting said backpack water container in order to fill it, said backpack water container having a bottom, comprising in operative combination:
   a) a first, female quick disconnect connector assembly having a central bore and a first, threaded end for threaded coupling to said bottom of said backpack water container for receiving and dispensing water therefrom, said threaded end being selected from a male-threaded end and a female-threaded end, and a second end having a spring-biased collar that is axially reciprocable to releasably receive a second, male quick-disconnect member;
   b) said female quick disconnect connector assembly including an internal spring-biased, axially reciprocable valve for selective closure and opening of said bore for water flow therethrough;
   c) a second, male quick-disconnect nozzle assembly comprising an outer tubular sleeve having an external surface configured with angled shoulders disposed medially of a forward tip, said shoulders being adapted to releasably engage said first female quick disconnect connector assembly when inserted therein;
   d) said outer tubular sleeve at said forward tip including an inwardly tapering surface; said outer tubular sleeve including an axial bore extending a length of said sleeve and having an inner surface, said axial bore including a forward bore portion having first diameter extending back of said forward tip and joining, medially of the length of said sleeve, a second, larger diameter bore portion extending to a rear, stop end, a juncture of said first and second diameter bore portions forming a shoulder configured to receive a sealing member, and said larger diameter portion of said bore including threads formed in a portion thereof for threadedly engaging an inner stem member;
   e) said second, male nozzle assembly including an inner stem member terminating at a forward end in a tip including a surface having an outward taper that matches the inwardly tapering surface of said outer tubular sleeve such that said tubular sleeve taper and said stem taper together cooperate to form a water spray tip,
      i) said inner stem member having an opposed end including a female threaded union,
      ii) said inner stem member including a forward portion having a first diameter less than said sleeve axial bore first diameter portion and a rearward portion having a second diameter sized to fit said sleeve axial bore second diameter portion,
      iii) said inner stem member second diameter being larger than said inner stem member first diameter,
      iv) a juncture of said inner stem member portions forming a shoulder,
      v) a first O-ring mounted on said inner stem forward portion in engagement with said inner stem member shoulder to form a seal with said sleeve shoulder to shut off water flow when said sleeve is rotated rearwardly on said inner stem member,
      vi) said rearward stem member portion including a threaded portion for cooperatively engaging the threads of said sleeve,
      vii) said stem member rearward portion including an axial bore communicating with said female threaded union and extending forwardly and terminating short of said shoulder,
      viii) at least one lateral bore in said stem member rearward portion disposed adjacent said forward portion of said stem member axial bore in communication between an outer surface of said rearward portion of said stem member and said stem member axial bore;
      ix) a second O-ring disposed in a groove formed in said stem member rearward portion, said groove being disposed rearward of said lateral bore providing a seal with said inner surface of said sleeve second portion to prevent backflow of water;
   f) said nozzle assembly outer sleeve and said inner stem member are cooperatively threaded to permit selection of the size of opening of said cooperating tapering surfaces of said spray tip to provide control of water ranging from stream, to spray, to mist by rotation of said outer sleeve with respect to said inner stem;
   g) said nozzle assembly outer sleeve of said second, male quick-disconnect nozzle assembly having an extended tubular nose section between said angled shoulders and said tip of length sufficient to fully open said internal spring-biased axially reciprocable valve of said female quick disconnect connector assembly when said male nozzle assembly is inserted into and engaged with said female quick disconnect connector assembly; and
   h) so that when said female quick disconnect connector assembly is fitted to said bottom of said backpack water container and said nozzle assembly is fitted to a water supply hose, said backpack water container can be rapidly and automatically filled from said water supply hose by inserting said male nozzle assembly into said female quick disconnect assembly without dismounting of said backpack water container.

2. A wildfire fighting water nozzle assembly for dual use of rapid filling of a wildfire firefighter's portable fire suppression backpack water container from a supply source and as a fire suppression water delivery nozzle at a fireline, comprising in operative combination:
   a) a male quick-disconnect nozzle assembly having an outer tubular sleeve having an external surface configured with exterior angled shoulders disposed medially of a forward tip, said shoulders being adapted to releasably engage a separate female quick disconnect connector assembly when inserted therein, said outer tubular sleeve at said forward tip including an internally angled tapering surface;
   b) said male quick-disconnect nozzle assembly including an inner stem member fitted within a stepped axial bore of said outer tubular sleeve,
      i) said stepped axial bore having a forward portion having a first diameter joining at a shoulder a rearward second portion having a larger second diameter and including a threaded section thereof,
      ii) said inner stem member terminating at a forward end in a tip and an opposed end including a female threaded union,
      iii) said stem tip including a surface having a taper that matches the internally angled tapering surface of said outer tubular sleeve, said inner stem tip tapering surface cooperating with said internally angled tapering surface of said outer sleeve to form a water spray tip to provide selectable fluid delivery depending on the spacing of tapering surfaces of said tubular sleeve and said stem tips,
      iv) said inner stem member including a forward portion having a first diameter less than said stepped axial bore first diameter and a rearward portion having a second diameter sized to fit said stepped axial bore second diameter portion, v) said inner stem member second diameter being larger than said inner stem member first diameter,
vi) a juncture of said inner stem members forming a shoulder,
vii) a first O-ring mounted on said inner stem forward portion in engagement with said inner stem member shoulder to form a seal with said sleeve shoulder to shut off water flow when said outer tubular sleeve is rotated rearwardly on said inner stem member,
viii) said inner stem member rearward portion including a threaded portion for cooperatively engaging the threads of said outer tubular sleeve,
ix) said inner stem member rearward portion including an axial bore communicating with said female threaded union and extending forwardly and terminating short of said shoulder,
x) at least one lateral bore in said inner stem member rearward portion disposed adjacent said forward end of said inner stem member axial bore in communication between an outer surface of said rearward portion and said inner stem member axial bore;
xi) a second O-ring disposed in a groove formed in said inner stem member rearward portion, said groove being disposed rearward of said lateral bore providing a seal with an inner surface of said outer tubular sleeve rearward second portion to prevent backflow of water;

c) said outer tubular sleeve member and said inner stem member are cooperatively threaded to permit selection of the spacing between said tapering surfaces of said outer tubular sleeve and said inner stem member tip to provide control of fluid ranging from stream, to spray, to mist by rotation of said outer tubular sleeve with respect to said inner stem member;

d) said outer tubular sleeve having a tubular nose section between said shoulders and said tip of length sufficient to fully open an internal spring-biased axially reciprocable valve of said female quick disconnect connector assembly, when said nozzle is inserted into and engaged with said female quick disconnect connector assembly; and e) so that when said female quick disconnect connector assembly is fitted to a bottom of said backpack container and said male nozzle assembly is fitted to a water supply hose, said backpack container can be rapidly and automatically filled from said water supply hose via said container bottom so that said backpack container can be quickly filled without dismounting of said backpack container.

\* \* \* \* \*